(12) United States Patent
Aisaka et al.

(10) Patent No.: US 10,833,335 B2
(45) Date of Patent: Nov. 10, 2020

(54) STAINLESS STEEL SUBSTRATE

(71) Applicant: Toyota Jidosha Kabushiki Kaisha, Toyota-shi, Aichi-ken (JP)

(72) Inventors: Takashi Aisaka, Miyoshi (JP); Takashi Kono, Tajimi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 15 days.

(21) Appl. No.: 16/285,486

(22) Filed: Feb. 26, 2019

(65) Prior Publication Data

US 2019/0267641 A1    Aug. 29, 2019

(30) Foreign Application Priority Data

Feb. 28, 2018 (JP) ................ 2018-034606

(51) Int. Cl.
| | |
|---|---|
| *H01M 8/02* | (2016.01) |
| *H01M 8/0232* | (2016.01) |
| *C22C 14/00* | (2006.01) |
| *H01M 8/021* | (2016.01) |
| *H01M 8/1018* | (2016.01) |
| *H01M 8/1039* | (2016.01) |

(52) U.S. Cl.
CPC .......... *H01M 8/0232* (2013.01); *C22C 14/00* (2013.01); *H01M 8/021* (2013.01); *H01M 8/1039* (2013.01); *H01M 2008/1095* (2013.01); *H01M 2300/0082* (2013.01)

(58) Field of Classification Search
CPC .......... C21D 6/002; C21D 1/74; C22C 38/26; H01M 8/0232; H01M 8/021
See application file for complete search history.

(56) References Cited

U.S. PATENT DOCUMENTS

| | | | |
|---|---|---|---|
| 4,010,049 A * | 3/1977 | Rarey ............... | C22C 38/22 148/325 |
| 2002/0012827 A1 * | 1/2002 | Mizuno ............ | H01M 8/0258 429/458 |
| 2009/0239129 A1 * | 9/2009 | Seido ............... | H01M 8/0267 429/437 |
| 2017/0301929 A1 | 10/2017 | Tarutani | |

FOREIGN PATENT DOCUMENTS

| | | |
|---|---|---|
| JP | 2010205443 A | 9/2010 |
| WO | 2016052622 A1 | 4/2016 |

* cited by examiner

*Primary Examiner* — Jessee R Roe
(74) *Attorney, Agent, or Firm* — Dinsmore & Shohl LLP

(57) ABSTRACT

The present disclosure provides a stainless steel substrate used for a fuel cell separator that comprises Nb and is excellent in corrosion resistance. The embodiments relate to a stainless steel substrate used for a fuel cell separator, comprising Nb in a solid solution state, and comprising substantially no precipitate of a Nb-containing intermetallic compound.

8 Claims, 10 Drawing Sheets

(A)

(B)

(C)

STAINLESS STEEL SUBSTRATE

CROSS REFERENCE TO RELATED APPLICATIONS

The present application claims priority from Japanese patent application JP 2018-034606 filed on Feb. 28, 2018, the content of which is hereby incorporated by reference into this application.

BACKGROUND

Technical Field

The present disclosure relates to a stainless steel substrate for use as a fuel cell separator. In addition, the present disclosure relates to a fuel cell separator. In addition, the present disclosure relates to a fuel cell. In addition, the present disclosure relates to a method for manufacturing a stainless steel substrate for use as a fuel cell separator.

Background Art

A cell of a polymer electrolyte fuel cell comprises a membrane electrode assembly (MEA) comprising an ion-permeable electrolyte membrane, and an anode side catalyst layer (electrode layer) and a cathode side catalyst layer (electrode layer) sandwiching the electrolyte membrane. Gas diffusion layers (GDLs) for providing a fuel gas or an oxidant gas and collecting electricity produced by an electrochemical reaction are formed on both sides of the membrane electrode assembly. The membrane electrode assembly having the GDLs disposed on both sides is referred to as a MEGA (Membrane Electrode & Gas Diffusion Layer Assembly), and the MEGA is sandwiched between a pair of separators. Here, the MEGA is the power generation portion of the fuel cell, and when there are no gas diffusion layers, the membrane electrode assembly is the power generation portion of the fuel cell.

As stainless steel used in a polymer electrolyte fuel cell, JP 2010-205443 A discloses stainless steel for a polymer electrolyte fuel cell separator with a small amount of ions dissolved at high potential, containing C: 0.03% or less, N: 0.03% or less, Si: 0.01 to 2.0%, Mn: 0.01 to 2.0%, Al: 0.001 to 0.3%, Cr: 20 to 35%, Mo: 4.0% or less, and Nb: 0.2 to 2.0% in terms of % by mass, the balance being Fe and unavoidable impurities, and further the amount of Cr, the amount of Nb, and the amount of Mo satisfying the relationship of a predetermined formula. In addition, JP 2010-205443 A describes Nb being an element effective in fixing C and N in steel as a carbonitride to improve corrosion resistance and press formability.

In addition, International Publication No. WO 2016/052622 discloses a ferritic stainless steel material which has a predetermined chemical composition and in which a value calculated by a predetermined formula is 20 to 45%, and $M_2B$ type boride-based metal precipitates are dispersed in a parent phase comprising only a ferrite phase, and exposed to the surface. In addition, International Publication No. WO 2016/052622 describes Nb being an optionally added element in the invention of International Publication No. WO 2016/052622, but being an element for stabilizing C and N in steel.

SUMMARY

As described above, it is known that Nb as a sensitization inhibitor is added to a stainless steel substrate used as a fuel cell separator. Here, sensitization is a phenomenon in which the Cr concentration along grain boundaries in a metal decreases, and Cr-deficient portions (portions having low Cr concentration) are produced. The sensitization is caused by the fact that carbon that is an impurity present around grain boundaries forms metal carbides ($Cr_{23}C_6$ and the like) with Cr, and gathers Cr around the grain boundaries.

However, even if a stainless steel substrate whose corrosion resistance is improved by comprising Nb as a sensitization inhibitor is used as a fuel cell separator, corrosion may occur in a corrosive environment. Particularly, a separator of a polymer electrolyte fuel cell is placed in a corrosive environment harsh for stainless steel, including the dissolution of $F^-$ ions from the solid polymer membrane, the inflow of $Cl^-$ ions from the outside air, and low pH due to the concentration of $H^+$ ions in produced water, and therefore the above problem emerges significantly. Therefore, a stainless steel substrate used for a fuel cell separator is required to have superior corrosion resistance.

Accordingly, the present disclosure provides a stainless steel substrate used for a fuel cell separator that comprises Nb and is excellent in corrosion resistance.

The present inventors have studied diligently, and newly found that intermetallic compounds containing Nb, that is, Nb-containing intermetallic compounds, are precipitated in a Nb-containing stainless steel substrate, the precipitates of these Nb-containing intermetallic compounds dissolve as metal ions in a corrosive environment, and pitting corrosion occurs in the stainless steel substrate with these dissolved portions being starting points.

More specifically, for example, in a commercially available stainless steel substrate comprising Nb (for example, SUS447J1L), precipitates of Nb-containing intermetallic compounds are present as shown in the TEM photograph of FIG. 1. The precipitates of the Nb-containing intermetallic compounds are present particularly around grain boundaries. As shown in FIG. 2, when these precipitates of the Nb-containing intermetallic compounds are placed in the corrosive environment of a fuel cell in which an acid, fluorine ions, chlorine ions, and the like are present, the precipitates dissolve as metal ions. Then, with these dissolved portions being starting points, corrosion proceeds further, and pitting corrosion occurs in the stainless steel substrate. Specifically, FIG. 2(A) shows a state in which a precipitate of a Nb-containing intermetallic compound is present in a stainless steel substrate. Next, as shown in FIG. 2(B), this precipitate of the Nb-containing intermetallic compound dissolves in produced water comprising an acid, fluorine ions, chlorine ions, and the like. Particularly, under the operation of a fuel cell, potential is applied, and therefore the dissolution of the precipitate is likely to proceed. Next, as shown in FIG. 2(C), with a pit formed by the dissolution of the precipitate being a starting point, pitting corrosion proceeds.

The present inventors have obtained a stainless steel substrate in which substantially no precipitates of Nb-containing intermetallic compounds are present by heating a stainless steel substrate to dissolve precipitates of Nb-containing intermetallic compounds, and then quenching the stainless steel substrate. Then, the present inventors have found that this stainless steel substrate comprising substantially no precipitates of Nb-containing intermetallic compounds is excellent in corrosion resistance as a fuel cell separator, and arrived at the embodiments.

Examples of aspects of the embodiments will be described below.

(1) A stainless steel substrate used for a fuel cell separator, comprising Nb in a solid solution state, and comprising substantially no precipitate of a Nb-containing intermetallic compound.
(2) The stainless steel substrate according to (1), comprising the Nb in a range of 0.05 to 0.50% by mass.
(3) A fuel cell separator comprising a stainless steel substrate,
wherein the stainless steel substrate comprises Nb in a solid solution state, and comprises substantially no precipitate of a Nb-containing intermetallic compound.
(4) The fuel cell separator according to (3), wherein the stainless steel substrate comprises the Nb in a range of 0.05 to 0.50% by mass.
(5) A fuel cell comprising:
the fuel cell separator according to (3) or (4); and
a solid electrolyte membrane.
(6) The fuel cell according to (5), wherein the solid electrolyte membrane comprises a fluorine-based electrolyte resin.
(7) A method for manufacturing a stainless steel substrate for use as a fuel cell separator, comprising:
heating a stainless steel substrate comprising a precipitate of a Nb-containing intermetallic compound under an inert atmosphere to dissolve the Nb-containing intermetallic compound; and
quenching the stainless steel substrate after the heat treatment.
(8) The method for manufacturing a stainless steel substrate according to (7), comprising preparing the stainless steel substrate comprising the precipitate of the Nb-containing intermetallic compound by steps comprising
melting a raw material of stainless steel comprising at least Nb,
casting a stainless steel substrate from the molten raw material,
hot-rolling the cast stainless steel substrate,
cold-rolling the hot-rolled stainless steel substrate, and
pickling the cold-rolled stainless steel substrate.

Advantageous Effect

The present disclosure can provide a stainless steel substrate used for a fuel cell separator that comprises Nb and is excellent in corrosion resistance.

DETAILED DESCRIPTION

Figure 1:
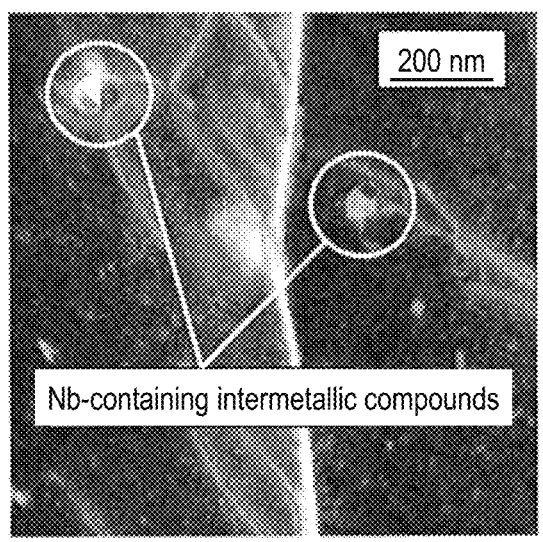
FIG. 1 is a TEM photograph of a stainless steel substrate.
Figure 2:
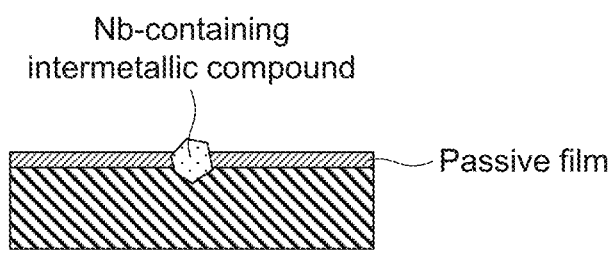
FIG. 2 is a schematic diagram for explaining a flow in which pitting corrosion occurs with a pit formed by the dissolution of a precipitate of a Nb-containing intermetallic compound being a starting point.
Figure 2:
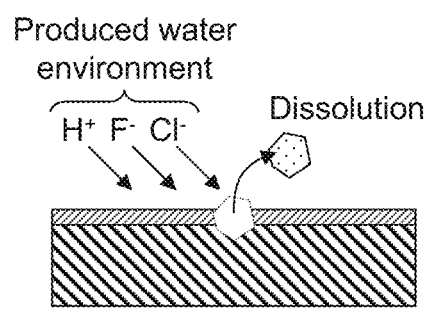
Figure 2:
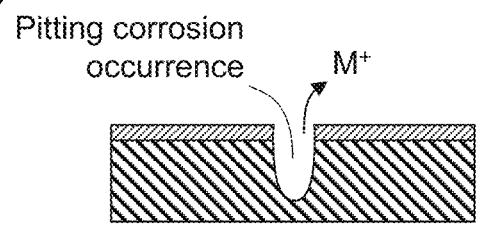

Aspects of the embodiments will be described below.
(Stainless Steel Substrate)
One aspect of the embodiments relates to a stainless steel substrate used for a fuel cell separator, comprising Nb in a solid solution state, and comprising substantially no precipitates of Nb-containing intermetallic compounds.

The stainless steel substrate according to the embodiments comprises Nb, and therefore sensitization is suppressed. In addition, in the stainless steel substrate according to the embodiments, Nb is contained in the substrate mainly in a solid solution state, and the stainless steel substrate according to the embodiments comprises substantially no precipitates of Nb-containing intermetallic compounds, and therefore substantially no portions that can dissolve to be the starting points of corrosion in a corrosive environment are present. Therefore, in the stainless steel substrate according to the embodiments, the occurrence of corrosion can be suppressed even in a corrosive environment in a fuel cell, particularly in the highly corrosive environment of a polymer electrolyte fuel cell or the like.

As used herein, "comprising substantially no precipitates of Nb-containing intermetallic compounds" means that in the stainless steel substrate according to the embodiments, no precipitates of Nb-containing intermetallic compounds are present at all, or precipitates of Nb-containing intermetallic compounds are present only to the extent that obtaining the effect of the embodiments is not hindered, even if present. In other words, "comprising substantially no precipitates of Nb-containing intermetallic compounds" means that the stainless steel substrate according to the embodiments may comprise precipitates of Nb-containing intermetallic compounds to the extent that obtaining the effect of the embodiments is not hindered. As used herein, precipitates of Nb-containing intermetallic compounds refer to precipitates containing Nb at a concentration of 0.5% by mass or more.

As used herein, stainless steel means steel comprising 1.2% by mass or less of C and 10.5% or more of Cr as defined in the Japanese Industrial Standards (JIS).

In some embodiments, the content of Nb contained in the stainless steel substrate is 0.05% by mass or more and 0.50% by mass or less. When the content of Nb is 0.05% by mass or more, the function of Nb as a sensitization inhibitor can be effectively exhibited. When the content of Nb is 0.50% by mass or less, the formation of precipitates of Nb-containing intermetallic compounds can be effectively suppressed. In some embodiments, the content of Nb contained in the stainless steel substrate is 0.10% by mass or more. In some embodiments, the content of Nb contained in the stainless steel substrate is 0.40% by mass or less, or 0.30% by mass or less.

In the embodiments, in some cases, "comprising substantially no precipitates of Nb-containing intermetallic compounds" means that the number of precipitates of Nb-containing intermetallic compounds having a particle diameter of 2 μm or more is five or less (for examples, three or less) in an image (size: 50 μm long×50 μm wide) obtained by observing the stainless steel substrate by EPMA (magnification: 1000). The particle diameter means the diameter of a circle having the same area as a precipitate of a Nb-containing intermetallic compound (circle-equivalent diameter) on the image. The particle diameter can be calculated, for example, using commercial software. Examples thereof can include WinRoof.

In some embodiments, the stainless steel substrate comprises Fe as the main component, and comprises 18 to 30% by mass of Cr, 0 to 2.0% by mass of Mo, 0 to 0.02% by mass of C, 0 to 0.02% by mass of N, 0 to 0.1% by mass of Cu, 0 to 0.05% by mass of Al, 0 to 0.4% by mass of Si, 0 to 0.001% of S, 0 to 0.03% by mass of P, 0 to 0.1% by mass of Mn, and 0.05 to 0.50% by mass of Nb.

The stainless steel substrate is not particularly limited, and is, for example, austenitic, ferritic, or austenitic-ferritic duplex.

The shape of the stainless steel substrate is not particularly limited, and is, for example, a plate shape.

The stainless steel substrate may comprise a protective film such as a metal oxide film on its surface other than an oxide film necessarily formed on the surface of the stainless steel substrate. The metal oxide film can be formed, for example, by a physical vapor deposition method (PVD) using sputtering, vacuum deposition, ionized deposition, ion plating, or the like. Examples of the metal oxide film include tin oxide having high electrical conductivity.

(Method for Manufacturing Stainless Steel Substrate)

One aspect of the embodiments is a method for manufacturing a stainless steel substrate for use as a fuel cell separator, comprising a heat treatment step of heating a stainless steel substrate comprising precipitates of Nb-containing intermetallic compounds under an inert atmosphere to dissolve the Nb-containing intermetallic compounds; and a quenching step of quenching the stainless steel substrate after the heat treatment step. By the embodiments, a stainless steel substrate comprising Nb in a solid solution state, and comprising substantially no precipitates of Nb-containing intermetallic compounds can be obtained.

In the heat treatment step, a stainless steel substrate comprising precipitates of Nb-containing intermetallic compounds is heated under an inert atmosphere to dissolve the Nb-containing intermetallic compounds. By heating the stainless steel substrate under the inert atmosphere, oxidation on the surface of the stainless steel can be suppressed.

The stainless steel substrate to be treated may be fabricated from a raw material of stainless steel. Specifically, the stainless steel substrate to be treated may be prepared by steps comprising a raw material melting step, a casting step, a hot rolling step, a cold rolling step, and a pickling step. In other words, in some embodiments, the stainless steel substrate comprising the precipitates of the Nb-containing intermetallic compounds is prepared by a step comprising a melting step of melting a raw material of stainless steel comprising at least Nb, a casting step of casting a stainless steel substrate from the molten raw material, a hot rolling step of hot-rolling the cast stainless steel substrate, a cold rolling step of cold-rolling the hot-rolled stainless steel substrate, and a pickling step of subjecting the cold-rolled stainless steel substrate to pickling treatment.

As the raw material of stainless steel, for example, stainless steel powder can be used. The stainless steel powder comprises, for example, Fe as the main component, and comprises 18 to 30% by mass of Cr and 0.05 to 0.50% by mass of Nb, in some embodiments.

The stainless steel substrate to be treated is a stainless steel substrate comprising precipitates of Nb-containing intermetallic compounds, and, for example, a commercially available stainless steel substrate may be used. As such a stainless steel substrate, for example, SUS447J1L, SUS444, SUS429, and SUS430J1L can be used.

Examples of the precipitates of the Nb-containing intermetallic compounds include $NbFe_2$, $NbMo$, and $NbCr$. The presence of the precipitates of the Nb-containing intermetallic compounds can be confirmed, for example, by TEM, EPMA, or a residue extraction method.

The compositions of the Nb-containing intermetallic compounds can be determined, for example, by EDS, XRD, or EELS.

Phase diagrams can be made from the compositions of the Nb-containing intermetallic compounds by Thermo-Calc (integrated thermodynamic calculation system) or the like to grasp temperatures at which the Nb-containing intermetallic compounds dissolve.

Whether the Nb-containing intermetallic compounds are dissolved in the base material or not can be confirmed by observing the stainless steel substrate before and after treatment by EPMA or TEM.

The heating temperature in the heat treatment step is a temperature at which the precipitates of the Nb-containing intermetallic compounds present in the stainless steel substrate before the heat treatment step are dissolved. In some embodiments, the heating temperature in the heat treatment step is 950° C. or more, 1000° C. or more, 1050° C. or more, 1100° C. or more, or 1125° C. or more. By setting the heating temperature at 950° C. or more, the precipitates of the Nb-containing intermetallic compounds can be effectively dissolved in the base material. In some embodiments, the heating temperature in the heat treatment step is 1200° C. or less. By setting the heating temperature at 1200° C. or less, a furnace having high heat resistance is unnecessary. The heating time can be appropriately selected according to the solid solution states of the precipitates of the Nb-containing intermetallic compounds, and is, for example, 0.1 to 60 minutes.

After the heat treatment step, the quenching step is performed to rapidly lower the temperature of the stainless steel substrate. By rapidly lowering the temperature, the precipitation of the Nb-containing intermetallic compounds is suppressed, and a stainless steel substrate comprising substantially no precipitates of Nb-containing intermetallic compounds can be obtained.

Examples of the quenching means include gas cooling, water cooling, or oil cooling. Examples of the gas used for gas cooling include Ar, He, $NH_3$ decomposition gas, and $N_2$.

In some embodiments, the average cooling rate to 500° C. is 300° C./s or more, or 500° C./s or more. By setting the average cooling rate to 500° C. at 300° C./s or more, precipitation of the Nb-containing intermetallic compounds can be more effectively suppressed. The average cooling rate is one obtained by dividing a value obtained by subtracting 500° C. from the temperature of the heat treatment step by the time until 500° C. is reached from the start of cooling.

Figure 3:
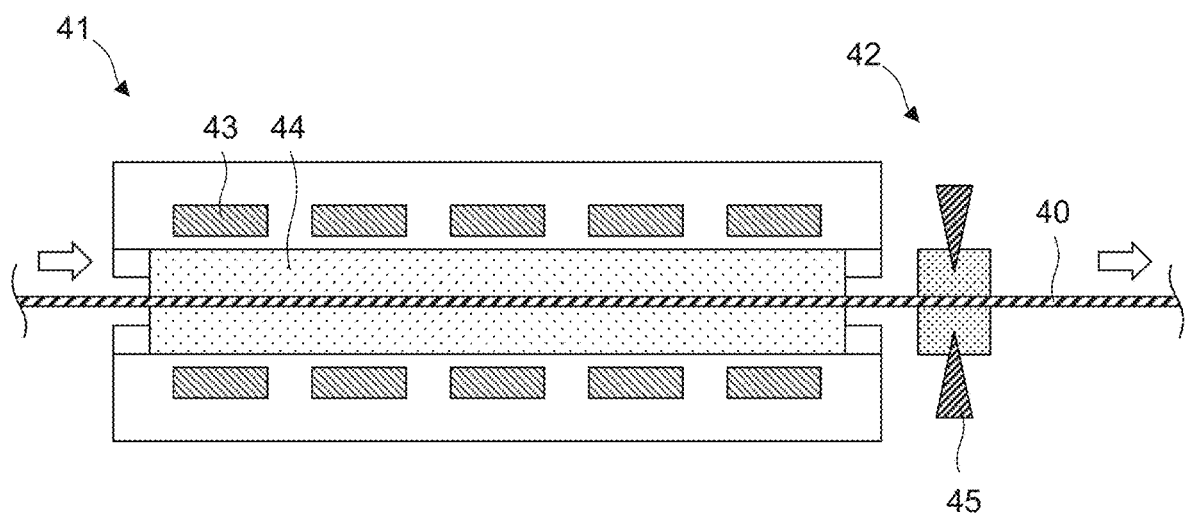
FIG. 3 is a schematic diagram showing examples of the configurations of apparatuses used in a heat treatment step and a quenching step in a method for manufacturing a stainless steel substrate according to the embodiments.

FIG. 3 is a schematic diagram showing a heating apparatus 41 for performing heat treatment, and a cooling apparatus 42 for performing quenching treatment. The heating apparatus 41 heats a stainless steel substrate 40 comprising precipitates of Nb-containing intermetallic compounds by heaters 43 while the stainless steel substrate 40 is conveyed in the direction of the arrow. For example, the stainless steel substrate 40 subjected to pickling treatment can be directly conveyed into the heating apparatus 41. In the interior of the heating apparatus 41, an inert atmosphere 44 is provided by an inert gas or the like, and thus heat treatment can be performed while surface oxidation is suppressed. Next, a coolant such as a cooling gas is blown onto the heat-treated stainless steel substrate 40 from the quenching gas nozzles 45 of the cooling apparatus 42 for quenching treatment. This quenching treatment can also be performed with conveyance.

The heat treatment step and the quenching step can also be performed, for example, using a heating and cooling apparatus comprising a heating chamber for subjecting the stainless steel substrate to heat treatment, and a cooling chamber for quenching the stainless steel substrate heated in the heating chamber. First, the stainless steel substrate comprising the precipitates of the Nb-containing intermetallic compounds is disposed in the heating chamber. Before an inert gas is introduced, the heating chamber is evacuated. Then, an inert gas (for example, Ar or He) whose dew point is adjusted by a dew point adjusting apparatus is supplied into the heating chamber from an inert gas supply source. Next, the interior of the heating apparatus is heated using a heater, to dissolve the precipitates of the Nb-containing intermetallic compounds present in the stainless steel substrate. After the heat treatment is completed, the inert gas is discharged from the heating chamber. Next, the heat-insulating door between the heating chamber and the cooling chamber is opened, and the stainless steel substrate is conveyed from the heating chamber to the cooling chamber by conveying means. When the stainless steel substrate is conveyed to the cooling chamber, the heat-insulating door is closed, and a cooled inert gas (for example, Ar or He) is supplied from a gas supply source into the cooling chamber, and the cooled gas is blown onto the stainless steel substrate for quenching. The inert gas is supplied into the cooling chamber while the temperature of the inert gas is controlled, for example, at 30° C. or less.

(Structure of Fuel Cell)

A fuel cell according to the embodiments will be described below with reference to a drawing. A case where a fuel cell separator according to the embodiments is applied to a fuel cell to be mounted in a fuel cell vehicle or the like will be described below as one example. However, the present disclosure is not limited by such an example.

Figure 4:
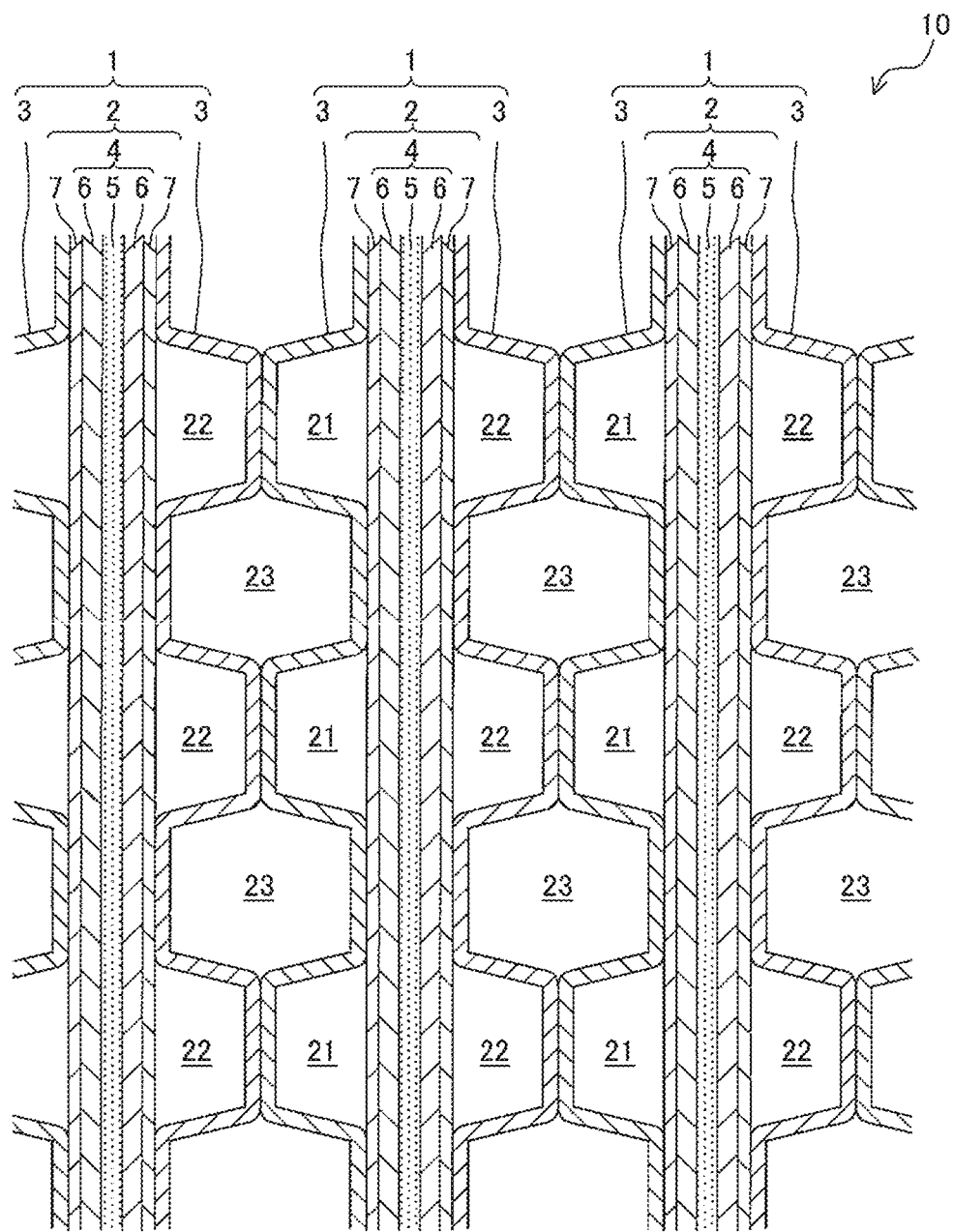
FIG. 4 is a schematic cross-sectional view for explaining an example of the configuration of a fuel cell according to the embodiments.
Figure 5:
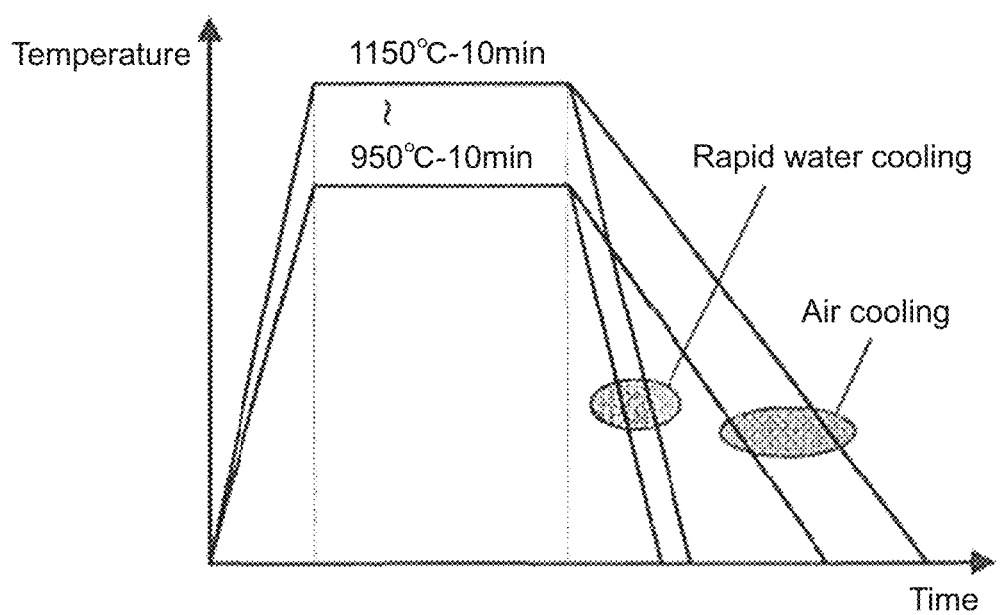
FIG. 5 is a diagram showing the temperature profiles of heat treatment steps and quenching steps in Examples or Comparative Examples.

FIG. 4 is a diagram of the main part of a fuel cell stack (fuel cell) 10 seen in cross section. As shown in FIG. 4, a plurality of cells (single cells) 1 that are basic units are laminated in the fuel cell stack 10. Each cell 1 is a polymer electrolyte fuel cell that generates electromotive force by the electrochemical reaction of an oxidant gas (for example, air) and a fuel gas (for example, hydrogen). The cell 1 comprises a MEGA 2 and a separator 3 that is in contact with the MEGA 2 so as to define the MEGA 2. In the embodiments, the MEGA 2 is sandwiched between a pair of separators 3 and 3.

In the MEGA 2, a membrane electrode assembly (MEA) 4 and gas diffusion layers 7 and 7 disposed on both surfaces of the membrane electrode assembly 4 are integrated. The membrane electrode assembly 4 comprises an electrolyte membrane 5 and a pair of electrodes 6 and 6 joined so as to sandwich the electrolyte membrane 5. The electrolyte membrane 5 comprises a proton-conducting ion exchange membrane formed of a solid polymer material. The electrode 6 is formed, for example, of a porous carbon material supporting a catalyst such as platinum. The electrode 6 disposed on one side of the electrolyte membrane 5 is an anode, and the electrode 6 on the other side is a cathode. The gas diffusion layer 7 is formed of an electrically conductive member having gas permeability. Examples of the electrically conductive member having gas permeability include carbon porous bodies such as carbon paper or carbon cloth, or metal porous bodies such as metal meshes or foamed metals.

The MEGA 2 is the power generation portion of the fuel cell 10, and the separator 3 is in contact with the gas diffusion layer 7 of the MEGA 2. When the gas diffusion layer 7 is not present, the membrane electrode assembly 4 is the power generation portion, and in this case, the separator 3 is in contact with the membrane electrode assembly 4. Therefore, the power generation portion of the fuel cell 10 comprises the membrane electrode assembly 4, and is in contact with the separator 3.

The separator 3 is a plate-shaped member using a metal excellent in electrical conductivity, gas impermeability, and the like as a substrate. One surface of the separator 3 abuts the gas diffusion layer 7 of the MEGA 2, and the other surface abuts another adjacent separator 3.

Each separator 3 is formed in a wavy shape. For the shape of the separator 3, the shape of a wave is an isosceles trapezoid, and the top of the wave is flat, and both ends of this top form equal angles and are angular. In other words, each separator 3 has substantially the same shape whether it is seen from the front side or the back side. The top of the separator 3 is in surface contact with one gas diffusion layer 7 of the MEGA 2, and the top of the separator 3 is in surface contact with the other gas diffusion layer 7 of the MEGA 2.

Gas flow paths 21 defined between the gas diffusion layer 7 and the separator 3 on one electrode (that is, anode) 6 side are flow paths through which a fuel gas flows, and gas flow paths 22 defined between the gas diffusion layer 7 and the separator 3 on the other electrode (that is, cathode) 6 side are flow paths through which an oxidant gas flows. When the fuel gas is supplied to the gas flow paths 21 on one side opposed via the cell 1, and the oxidant gas is supplied to the gas flow paths 22, an electrochemical reaction occurs in the cell 1 to produce electromotive force.

Further, one cell 1 and another cell 1 adjacent to the one cell 1 are disposed with the electrode 6 that is an anode and the electrode 6 that is a cathode opposed to each other. In addition, the rear side top of the separator 3 disposed along the electrode 6 that is an anode in one cell 1, and the rear side top of the separator 3 disposed along the electrode 6 that is a cathode in another cell 1 are in surface contact with each other. Water as a cooling medium for cooling the cells 1 flows through spaces 23 defined between the separators 3 and 3 that are in surface contact with each other between two adjacent cells 1.

The fuel cell separator according to the embodiments comprises the stainless steel substrate according to the embodiments described above. Protective films such as tin oxide films may be provided on both surfaces of the stainless steel substrate (that is, the surface on the side to be in contact with the gas diffusion layer 7, and the surface on the side to be in contact with the adjacent separator 3).

The fuel cell separator in the embodiments is excellent in corrosion resistance even in a highly corrosive environment.

In a fuel cell, fluoride ions are likely to be generated from a fluorine-based electrolyte resin such as a perfluorosulfonic acid-based polymer as described above. Therefore, when a fuel cell uses a solid electrolyte membrane comprising a fluorine-based electrolyte resin, the fuel cell separator in the embodiments is particularly useful. Examples of the fluorine-based electrolyte resin include perfluorosulfonic acid-based polymers. Specific examples can include Nafion (trade name, manufactured by DuPont), Flemion (trade name, manufactured by Asahi Glass Co., Ltd.), and Aciplex (trade name, manufactured by Asahi Kasei Corporation). Among these, Nafion (trade name, manufactured by DuPont) can be suitably used because it is excellent in proton conductivity.

EXAMPLES

The embodiments will be described below based on Examples.

Example 1

A SUS447J1L plate material (Nb content: 0.20% by mass, Cr content: 30% by mass, Mo content: 2.0% by mass, C content: 0.015% by mass, N content: 0.015% by mass) was prepared as a stainless steel substrate containing Nb. The stainless steel substrate was disposed in a heating furnace, and heat-treated at 950° C. for 10 minutes. This heat treatment was performed in an inert gas atmosphere of argon gas, and the temperature in the heating furnace was increased at 50° C./s from ordinary temperature to 950° C., and maintained at 950° C. for 10 minutes. Then, the stainless steel substrate was removed from the heating furnace, and immediately immersed in water (room temperature) and quenched to obtain a stainless steel substrate E1. For the temperature of the stainless steel substrate in this quenching treatment, the average cooling rate from 950° C. to 500° C. was 500° C./s.

Example 2

A stainless steel substrate E2 was obtained as in Example 1 except that the heating temperature was set at 1050° C. instead of 950° C. For the temperature of the stainless steel substrate in the quenching treatment, the average cooling rate from 1050° C. to 500° C. was 500° C./s.

Example 3

A stainless steel substrate E3 was obtained as in Example 1 except that the heating temperature was set at 1100° C. instead of 950° C. For the temperature of the stainless steel substrate in the quenching treatment, the average cooling rate from 1100° C. to 500° C. was 500° C./s.

Example 4

A stainless steel substrate E4 was obtained as in Example 1 except that the heating temperature was set at 1150° C. instead of 950° C. For the temperature of the stainless steel substrate in the quenching treatment, the average cooling rate from 1150° C. to 500° C. was 500° C./s.

Comparative Example 1

The stainless steel substrate was heat-treated as in Example 1. Then, the stainless steel substrate was allowed to stand in the air (room temperature), and cooled to room temperature to obtain a stainless steel substrate C1. For the temperature of the stainless steel substrate in this cooling treatment, the average cooling rate from 950° C. to 500° C. was 100° C./s.

Comparative Example 2

The stainless steel substrate was heat-treated as in Example 4. Then, the stainless steel substrate was allowed to stand in the air (room temperature), and cooled to room temperature to obtain a stainless steel substrate C2. For the temperature of the stainless steel substrate in this cooling treatment, the average cooling rate from 1150° C. to 500° C. was 100° C./s.

Comparative Example 3

A SUS447J1L plate material was used as a stainless steel substrate C3.

<Pitting Corrosion Resistance Test>

The above stainless steel substrates E1 to E4 and C1 to C3 were used as test pieces, and the corrosion resistance of each test piece under strongly acidic conditions including fluorine ions and chlorine ions was examined by the following method.

Figure 6:
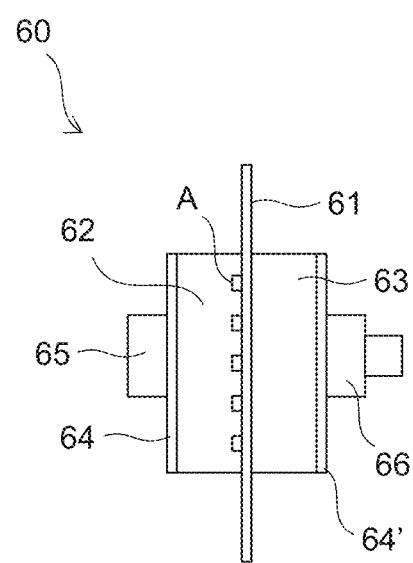
FIG. 6 is a schematic cross-sectional view for explaining the configuration of a gap formation member used in a pitting corrosion resistance test in the Examples.

First, NaF and NaCl were added to sulfuric acid (pH: 3.0) to prepare a sulfuric acid aqueous solution. Next, in an air open apparatus, each test piece was fixed to a gap formation member 60 as shown in FIG. 6, and immersed in the above sulfuric acid aqueous solution temperature-adjusted at 90° C. In FIG. 6, a test piece 61 was sandwiched between a cylindrical gap-forming material 62, a gasket 63, and washers 64 and 64', and further a bolt 65 was inserted into the bolt hole of the test piece 61, and then screwed using a nut 66. A plurality of grooves A are formed in a surface of the gap-forming material 62 so that gaps are formed between the gap-forming material 62 and the test piece. The gap-forming material 62 and the gasket 63 are made of a ceramic. The washers 64 and 64', the bolt 65, and the nut 66 are made of industrial pure titanium, but these are insulated from the test piece. A counter electrode comprising a platinum plate, and the test piece (sample electrode) were electrically connected in this state to produce a potential difference of 1.0 V between the counter electrode and the sample electrode. The potential of the test piece was kept constant by a reference electrode, and the test time was 2 hours. When a sudden increase in the current value (spike in current) was observed in this pitting corrosion resistance test (NaCl concentration: 30 ppm), the corrosion resistance was evaluated as C.

When no spike in current was observed in the above-described pitting corrosion resistance test (NaCl concentration: 30 ppm), a pitting corrosion resistance test (NaCl concentration: 50 ppm) was performed as in the pitting corrosion resistance test (NaCl concentration: 30 ppm) except that the concentration of NaCl was 50 ppm. When a spike in current was observed in this pitting corrosion resistance test (NaCl concentration: 50 ppm), the corrosion resistance was evaluated as B.

When no spike in current was observed in the above-described pitting corrosion resistance test (NaCl concentration: 50 ppm), a pitting corrosion resistance test (NaCl concentration: 70 ppm) was performed as in the pitting corrosion resistance test (NaCl concentration: 50 ppm) except that the concentration of NaCl was 70 ppm. When a spike in current was observed in this pitting corrosion resistance test (NaCl concentration: 70 ppm), the corrosion resistance was evaluated as A.

The above-described results are summarized in Table 1.

TABLE 1

|  | Heat treatment temperature [° C.] | Cooling treatment | Cooling rate [° C./second] | Corrosion resistance |
|---|---|---|---|---|
| Example 1 | 950 | Quenching | 500 | B |
| Example 2 | 1050 | Quenching | 500 | B |

TABLE 1-continued

| | Heat treatment temperature [° C.] | Cooling treatment | Cooling rate [° C./second] | Corrosion resistance |
|---|---|---|---|---|
| Example 3 | 1100 | Quenching | 500 | B |
| Example 4 | 1150 | Quenching | 500 | A |
| Comparative Example 1 | 950 | Standing in air | 100 | C |
| Comparative Example 2 | 1150 | Standing in air | 100 | C |
| Comparative Example 3 | — | — | — | C |

<EPMA Analysis>

Figure 7:
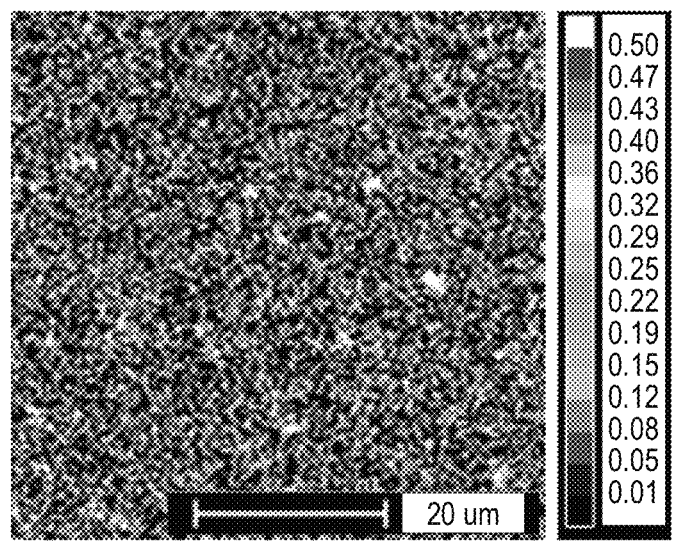
FIG. 7 is a diagram showing an EPMA photograph of a stainless steel substrate E1 obtained in Example 1 (950° C., quenching)
Figure 8:
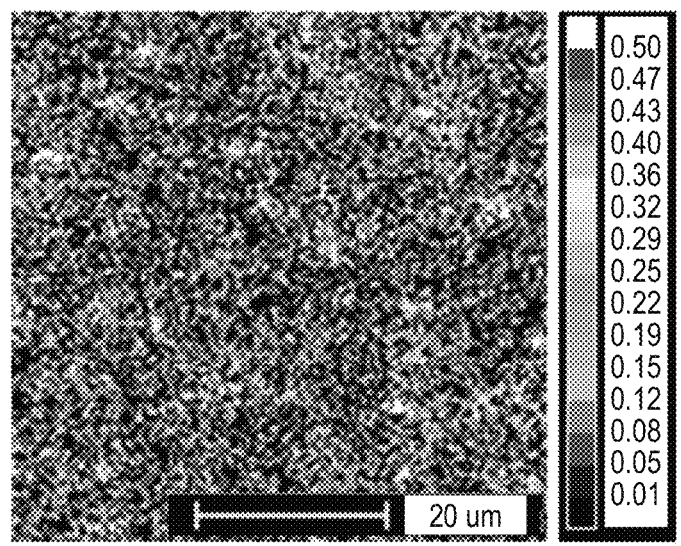
FIG. 8 is a diagram showing an EPMA photograph of a stainless steel substrate E4 obtained in Example 4 (1150° C., quenching)
Figure 9:
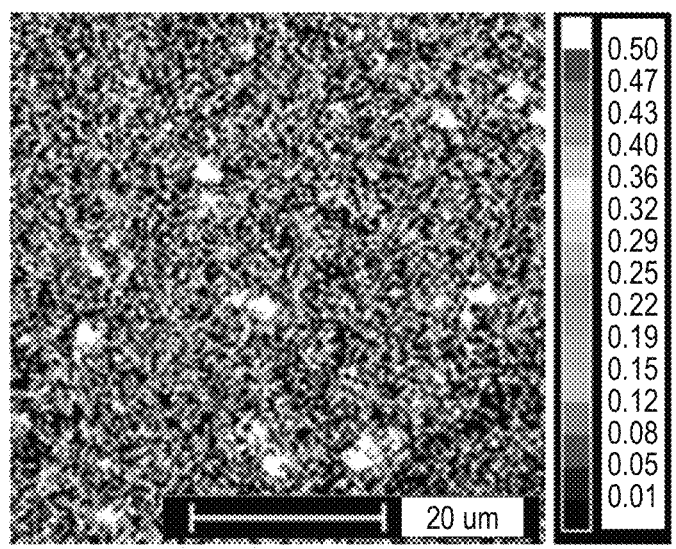
FIG. 9 is a diagram showing an EPMA photograph of a stainless steel substrate C2 obtained in Comparative Example 2 (1150° C., air cooling)
Figure 10:
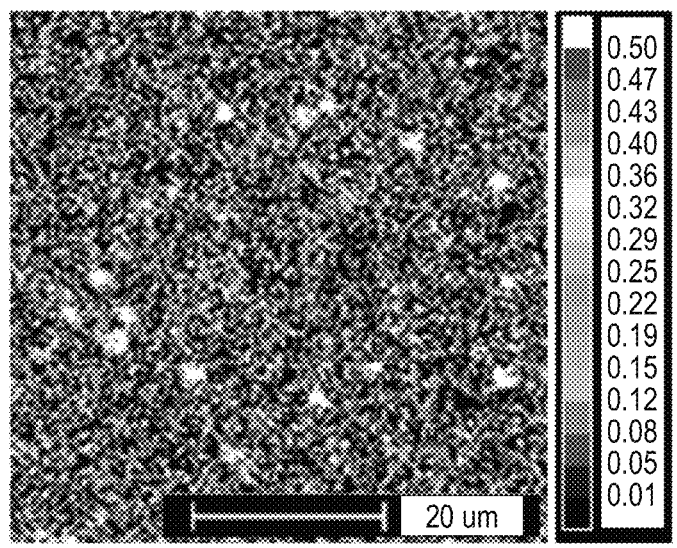
FIG. 10 is a diagram showing an EPMA photograph of a stainless steel substrate C3 obtained in Comparative Example 3 (SUS447J1L).

For the obtained stainless steel substrate E1, stainless steel substrate E4, stainless steel substrate C2, and stainless steel substrate C3, the state of the precipitation of Nb-containing intermetallic compounds was observed by EPMA (magnification: 1000). An EPMA photograph of the stainless steel substrate E1 is shown in FIG. 7. An EPMA photograph of the stainless steel substrate E4 is shown in FIG. 8. An EPMA photograph of the stainless steel substrate C2 is shown in FIG. 9. An EPMA photograph of the stainless steel substrate C3 is shown in FIG. 10. The image size of each EPMA photograph is 50 µm long×50 µm wide. In the stainless steel substrate C2 (FIG. 9) and the stainless steel substrate C3 (FIG. 10) corresponding to Comparative Examples, many precipitates of Nb-containing intermetallic compounds having a particle diameter of 2 µm or more (portions having a Nb concentration of 0.5% by mass or more) were present. On the other hand, in the stainless steel substrate E1 (FIG. 7) corresponding to an Example, the number of precipitates of Nb-containing intermetallic compounds having a particle diameter of 2 µm or more was two, and in the stainless steel substrate E4, the number of precipitates of Nb-containing intermetallic compounds having a particle diameter of 2 µm or more was zero, and there were substantially no precipitates of Nb-containing intermetallic compounds.

The embodiments of the present disclosure has been described in detail above, but the specific configuration is not limited to the embodiments. Even if design changes are made without departing from the spirit of the present disclosure, they are included in the present disclosure.

DESCRIPTION OF SYMBOLS

1 Cell
2 MEGA
3 Separator
4 Membrane electrode assembly (MEA)
5 Electrolyte membrane
6 Electrode
7 Gas diffusion layer
10 Fuel cell stack
21 Gas flow path
22 Gas flow path
23 Coolant flow path
40 Stainless steel substrate
41 Heating apparatus
42 Cooling apparatus
43 Heater
44 Inert atmosphere
45 Quenching gas nozzle
60 Gap formation member
61 Test piece
62 Gap-forming material
63, Gasket
64, 64' Washer
65 Bolt
66 Nut

What is claimed is:

1. A stainless steel substrate used for a fuel cell separator, comprising Nb in a solid solution state, and comprising substantially no precipitate of a Nb-containing intermetallic compound, wherein the stainless steel substrate is austenitic or austenitic-ferritic duplex.

2. The stainless steel substrate according to claim 1, comprising the Nb in a range of 0.05 to 0.50% by mass.

3. A fuel cell separator comprising a stainless steel substrate, wherein the stainless steel substrate comprises Nb in a solid solution state, and comprises substantially no precipitate of a Nb-containing intermetallic compound, wherein the stainless steel substrate is austenitic or austenitic-ferritic duplex.

4. The fuel cell separator according to claim 3, wherein the stainless steel substrate comprises the Nb in a range of 0.05 to 0.50% by mass.

5. A fuel cell comprising:
the fuel cell separator according to claim 3; and
a solid electrolyte membrane.

6. The fuel cell according to claim 5, wherein the solid electrolyte membrane comprises a fluorine-based electrolyte resin.

7. A method for manufacturing a stainless steel substrate for use as a fuel cell separator, comprising:
heating a stainless steel substrate comprising a precipitate of a Nb-containing intermetallic compound under an inert atmosphere to dissolve the Nb-containing intermetallic compound; and
quenching the stainless steel substrate after the heat treatment.

8. The method for manufacturing a stainless steel substrate according to claim 7, comprising preparing the stainless steel substrate comprising the precipitate of the Nb-containing intermetallic compound by steps comprising:
melting a raw material of stainless steel comprising at least Nb,
casting a stainless steel substrate from the molten raw material,
hot-rolling the cast stainless steel substrate,
cold-rolling the hot-rolled stainless steel substrate, and
pickling the cold-rolled stainless steel substrate.

* * * * *

UNITED STATES PATENT AND TRADEMARK OFFICE
CERTIFICATE OF CORRECTION

PATENT NO. : 10,833,335 B2  
APPLICATION NO. : 16/285486  
DATED : November 10, 2020  
INVENTOR(S) : Takashi Aisaka and Takashi Kono Page 1 of 1

It is certified that error appears in the above-identified patent and that said Letters Patent is hereby corrected as shown below:

On the Title Page

Item (72), Inventor 1, city, delete "Miyoshi" and insert --Miyoshi-shi Aichi--, therefor.

Item (72), Inventor 2, city, delete "Tajimi" and insert --Tajimi-shi Gifu--, therefor.

Item (73), assignee, city, delete "Toyota" and insert --Toyota-shi Aichi-ken--, therefor.

In the Specification

In Column 12, Line(s) 10, delete "63," and insert --63--, therefor.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*